United States Patent [19]

Beretsky et al.

[11] 4,412,544

[45] Nov. 1, 1983

[54] ULTRASONIC METHOD AND APPARATUS FOR IMAGING AND CHARACTERIZATION OF BODIES USING AMPLITUDE AND POLARITY DETECTION

[75] Inventors: Irwin Beretsky, New City, N.Y.; David E. Arnold, Bergenfield, N.J.; Bruno Pellegrini, Yonkers, N.Y.

[73] Assignee: Chromasonics, Inc., New City, N.Y.

[21] Appl. No.: 303,049

[22] Filed: Sep. 17, 1981

[51] Int. Cl.³ ............................................. A61B 10/00
[52] U.S. Cl. ...................................... 128/660; 73/620
[58] Field of Search .................. 73/619, 620; 128/660, 128/661

[56] References Cited

U.S. PATENT DOCUMENTS

| | | | |
|---|---|---|---|
| 3,830,223 | 8/1974 | Beretsky et al. | 128/660 |
| 3,934,458 | 1/1976 | Beretsky et al. | 128/660 |
| 4,063,549 | 12/1977 | Beretsky et al. | 128/660 |

Primary Examiner—Richard J. Apley
Assistant Examiner—George Yanulis
Attorney, Agent, or Firm—Blakely, Sokoloff, Taylor & Zafman

[57] ABSTRACT

As disclosed herein, a new and improved method and apparatus provides for the ensonification of at least a portion of a body part with acoustic energy pulses; detects the polarity and amplitude of the resultant echo pulse; and displays the detected data in a color television format to result in an improvement in resolution in indicia of tissue character. This improvement is accomplished by a process which simultaneously detects both the amplitude or strength of the echo pulse and the polarity sense of the echo pulse at the peak amplitude for each echo pulse. The improvement utilizes a general property of acoustical pulses to detect polarity and amplitude of the echo pulse. The amplitude and polarity measures of the echo pulse are used to produce intensity (luminance) and color (chrominance) throughout the body part for each individual picture element (pixel) forming the picture. Since multiple echoes and their corresponding polarities might correspond to a single pixel picture element, averaging of the polarity and amplitude information prior to display is required. Suitable averaging of the luminance and chrominance is provided to obtain the best measure of color within the picture element. Multiple lines of echo pulse trains are then stored as image information and displayed as a final image in a standard color television format.

23 Claims, 7 Drawing Figures

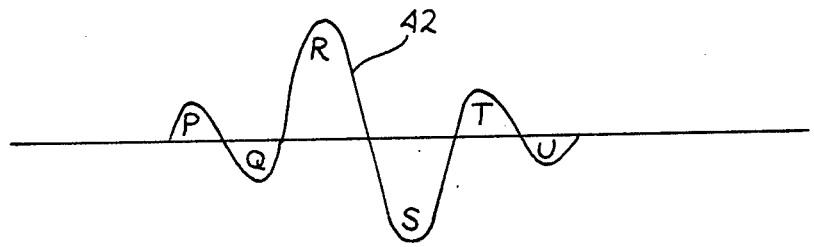
Fig. 2
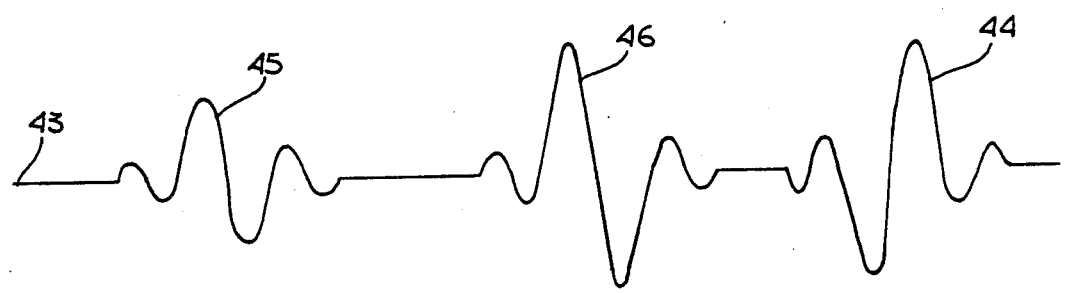
(echo) Fig. 3
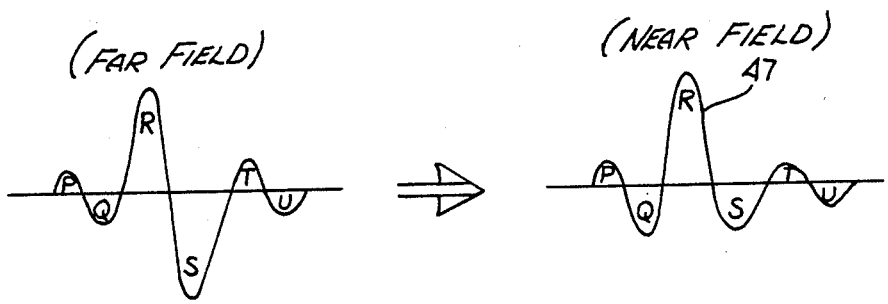
Fig. 4

Fig. 6
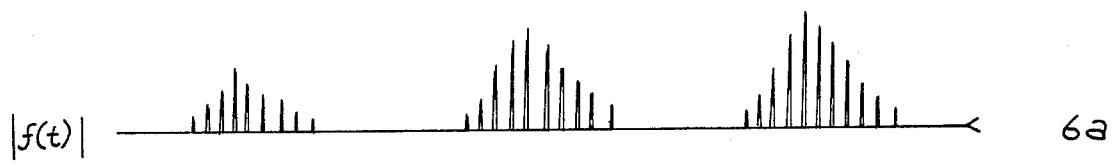
6a
6b
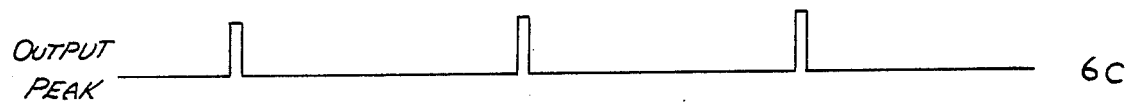
6c
6d
6e
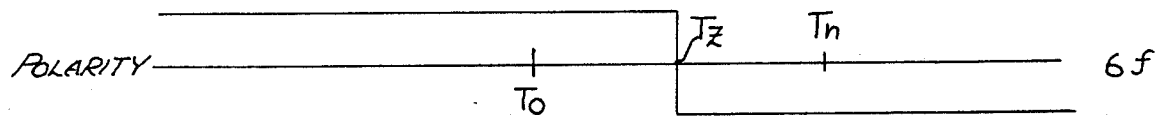
6f
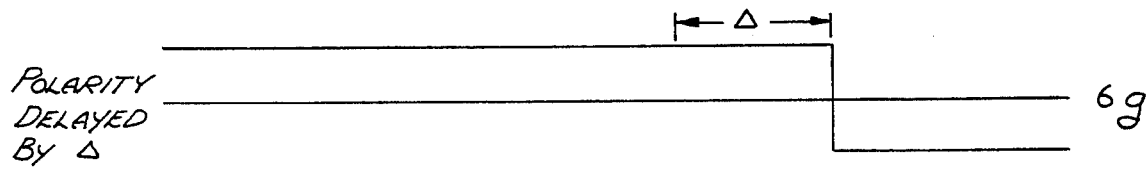
6g

ULTRASONIC METHOD AND APPARATUS FOR IMAGING AND CHARACTERIZATION OF BODIES USING AMPLITUDE AND POLARITY DETECTION

BACKGROUND OF THE INVENTION

1. Field of the Invention

This invention relates to a new and improved ultrasonic method and apparatus for noninvasive biophysical diagnosis.

2. Prior Art

Prior art acoustical interrogation methods and apparatus are described in Beretsky et al, U.S. Pat. No. 3,830,223, issued Aug. 20, 1974 entitled "Methodology and Apparatus for Non-Invasive Bio-physical Diagnosis"; Beretsky et al, U.S. Pat. No. 3,934,458 issued Jan. 27, 1976, and entitled "Method and Apparatus for Pulse Echo Imaging and Characterization of Bodies"; and Beretsky et al U.S. Pat. No. 4,063,549 issued Dec. 20, 1977, entitled "Ultrasonic Method and Apparatus for Imaging and Characterization of Bodies", wherein the technique of coherent detection, i.e., detection and processing of both amplitude and phase in reflected acoustical energy pulses, is generally described.

One technique of the prior art utilizes time domain and frequency domain signal processing techniques which are cumbersome and require enormous computer capacity (i.e., '223 and '549). Because of the nature of the acoustical pulses used in ultrasonic interrogation, mathematical singularities arise which are difficult to overcome and lead to appreciable degradation of the information. In the signal processing techniques utilized by the prior art, each echo returned is processed by first storing the individual return in a suitable memory, and is then followed by the use of signal processing algorithms which require significant processing time. The need for large amounts of memory and processing time to detect a returned echo, severely limits the application of these techniques to only those ultrasonic examinations which can be rapidly detected.

Another technique of the prior art (i.e., '458) detects polarity and amplitude of the returned echo without the need for complex signal processing by utilizing a specific acoustic pulse wave shape. However, achieving the desired wave shape is a difficult task and is complicated by minor imperfections in the manufacture of practical transducers. Both difficulties substantially reduce the effectiveness of this technique. Commonly utilized transducers produce more complex acoustic pulses than can be adapted to this process.

OBJECTS OF THE INVENTION

The object of this invention is to provide a new and improved ultrasonic method and apparatus which can detect the amplitude and polarity of an ultrasonic pulse train without the burden of time consuming signal processing techniques or specialized, acoustic transducers which are difficult to manipulate.

Another object of this invention is to provide a reliable method and apparatus which, when used with commonly utilized acoustic transducers, results in an amplitude and polarity measure for each acoustically reflecting interface.

Another object of this invention is to provide a reliable method and apparatus to detect a polarity and amplitude measure at each acoustically reflecting interface without requiring large amounts of computer memory and processing times.

Another object of this invention is to utilize polarity and amplitude information of an echo pulse train to achieve an improvement in the resolution of the resulting topographic image.

Another object of this invention is to provide a reliable method and apparatus using polarity and amplitude information of an echo pulse train to depict measures of tissue organization, structure and characteristics in a displayed image.

A further object of this invention is to utilize a color television display to depict the polarity information of the echo pulse train and to utilize the intensity of the displayed color to represent the amplitude information of the echo pulse train.

SUMMARY OF THE INVENTION

As disclosed herein, a new and improved method and apparatus provides for the ensonification of at least a portion of a body part with acoustic energy pulses; detects the polarity and amplitude of the resulant echo pulse; and displays the detected data in a color television format to result in an improvement in resolution in indicia of tissue character. This improvement is accomplished by a process which simultaneously detects both the amplitude or strength of the echo pulse and the polarity sense of the echo pulse at the peak amplitude for each echo pulse. The improvement utilizes a general property of acoustical pulses to detect polarity and amplitude of the echo pulse. The amplitude and polarity measures of the echo pulse are used to produce intensity (luminance) and color (chrominance) throughout the body part for each individual picture element (pixel) forming the picture. Since multiple echoes and their corresponding polarities might correspond to a single pixel picture element, averaging of the polarity and amplitude information prior to display is required. Suitable averaging of the luminance and chrominance is provided to obtain the best measure of color within the picture element. Multiple lines of echo pulse trains are then stored as image information and displayed as a final image in a standard color television format.

In particular, the present invention comprises an improvement in apparatus for processing multiple cycle, ultrasonic, pulse echo signals having amplitude and polarity in combination with a transceiver to send and receive ultrasound echoes. The improvement comprises an integrator means for accumulating the ultrasound echo signals for each half wave of the multicycle, ultrasound pulse echo signals and for generating an integrated, absolute value, halfwave signal from the halfwave of the multicycle pulse echo signal. A means is included for examining the plurality of the absolute value, halfwave signals and analyzing the plurality of halfwave signals to determine if a predetermined pattern indicative of a pulse echo among the plurality of half wave signals is present. The means for examining and analyzing is coupled to the integrator means. By virtue of this combination, individual echoes reflected from a complex body media are detected without deconvolution or computation and without the use of specialized ultrasound transducers.

The invention also includes an improvement in apparatus for displaying a plurality of detected signals (pixels) characterized by amplitude and polarity which improvement comprises a divider having polarity data input characteristic of the signed sum of the plurality of the detected signals, and having an ampltiude input characteristic of the sum of the absolute values of the plurality of detected signals. The divider generates an output ratio signal which is equal to the ratio of the polarity input to the amplitude input. A hue generator means is coupled to the divider and maps the output ratio signal into a linear combination of primary hue signals. By virtue of this combination, the polarity generates a color display for each pixel which is independent of the intensity of each pixel. The amplitude input is then used to generate an intensity signal for each pixel.

The resolution and indicia of tissue character can be improved by providing a weighted transition between ultrasound pulse echoes indicative of an acoustical interface. The improvement comprises a means for generating an amplitude signal characteristic of the amplitude of the peak of each echo; a means for generating a polarity signal characteristic of the sign of the peak of each echo; and a polarity change marker means coupled to the means for generating polarity and peak amplitude signals wherein the marker means computes a time of polarity reversal in response to the reversal of the polarity signal. The time selection is weighted by the peak amplitude signal for two successive pulse echoes one of which is just prior to and the other just subsequent to the reversal of the polarity signal. Thus, by use of the amplitude and polarity characteristics of the pulse echoes, a shaded transition is displayed between pulse echoes representing an acoustical interface.

The present invention also includes a method for detection of the amplitude and polarity of multicycle, pulse echoes reflected from complex media. The improvement comprises the steps of integrating each half-wave signal of the multicycle, pulse echo and generating an absolute integral value signal corresponding thereto. A series of successive integral value signals are then compared to determine if a predetermined pattern among them exists. If the predetermined pattern is detected, a peak identification signal is then generated. By reason of this combination of steps, ultrasound echoes can be detected without deconvolutional signal processing and computation and without the use of specialized acoustic pulse generators or transducers.

The present invention further includes an improvement in a method for displaying a plurality of detected signals for each pixel, which signals are characterized by an amplitude and polarity measure. The improvement comprises the steps of generating a ratio of the signed sum of the plurality of detected signals to the sum of the absolute values of the plurality detected signals. A linear combination of primary hue signals are then generated in response to the ratio. A $+1$ value of the ratio is mapped into a first primary hue; a $-1$ is mapped into a second primary hue; Zero (0) is a linear combination of equal amounts of $+1$ and $-1$ and represents a third hue which is not primary. Values between $+1$, 0 and $-1$ are mapped into linear combinations of the two primary hues.

The present invention further includes an improvement in a method for displaying weighted transition between ultrasound pulse echoes indicative of an acoustical interface, which improvement comprises the steps of generating a peak ampltiude signal characteristic of the magnitude of the peak of each echo and generating a plurality signal characteristic of the sign of the peak of each echo. A time of polarity reversal is then generated in response to a reversal of the polarity signal. The time of polarity reversal is selected between the time of two successive peak amplitude signals, which signals have correspondingly opposite signed polarity signals and which time of polarity reversal is selected to be proportionately nearer the time of the larger of the two successive peak amplitude signals. By this combination of steps, amplitude and polarity of the pulse echoes can be utilized to shade the display transition across an acoustical interface thereby increasing resolution and improving indicia identification of tissue character.

BRIEF DESCRIPTION OF THE DRAWINGS

FIG. 2 is a typical waveform for a transmitted acoustic pulse.

FIG. 3 is a typical train of echo pulses.

FIG. 4 shows change in waveform of an acoustical pulse in the near field region.

FIG. 6 is a timing diagram of several operative signals in the circuit of FIG. 5.

DETAILED DESCRIPTION OF THE INVENTION

A. System Description

Figure 1:
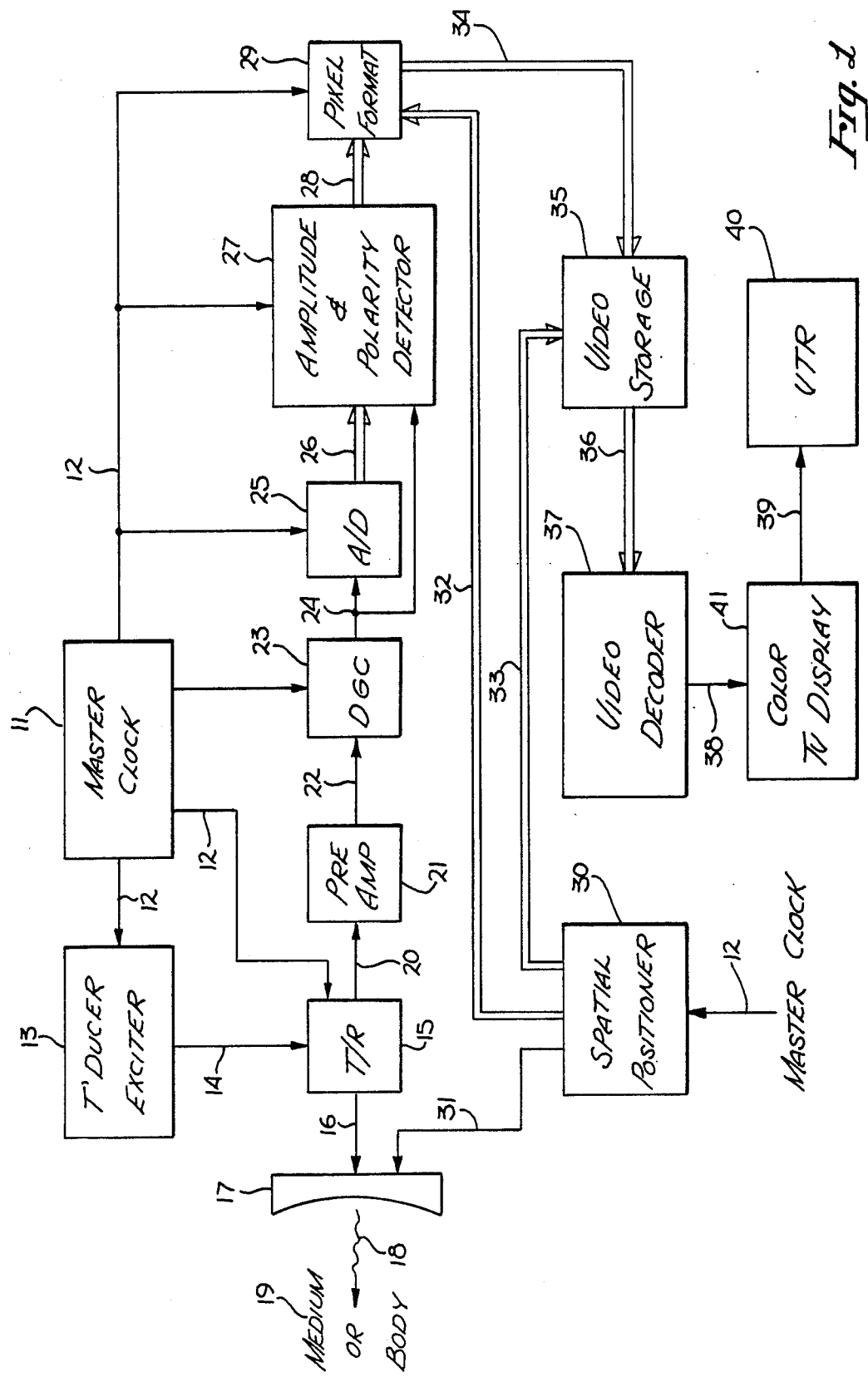
FIG. 1 is a simplified block diagram of a system illustrating the present invention.

The apparatus and method of the present invention can generally be understood by viewing FIG. 1. The system includes a master clock 11; a transducer control and transducer generally referenced by numeral 17; an analog input signal comprised of reflected echo pulse trains on input 16; a transmit and receive switch, (T/R) 15; an associated excitation source 13; signal conditioning modules generally indicated by reference numerals 21 and 23; an analog-to-digital converter 25; an amplitude and polarity detector 27; a pixel format module 29; a digital memory for video image storage 35, having input 33 from spatial positioner control 30, and input 34 from pixel format module 29; a video decoder module 37; a conventional color television display unit 41; and a means for storing in permanent form, each composite image, such as a conventional video tape recorder (VTR) 40.

Master clock 11 provides a time reference 12 used for image generation and control. A clock cycle begins when master clock 11 sends signal 12 to the excitation source 13 which in turn provides a voltage pulse 14 through the T/R switches 15 to excite transducer 17. This excitation produces an acoustic pulse 18 which is transmitted to a medium or body part 19. On that clock cycle spatial positioner 30, which is coupled to master clock 11, controls the direction of transducer 17 through control signal 31. The polar coordinate of transducer 17, describing the direction of the beam 18, is stored by spatial positioner 30 and is further utilized in signal trains 32 and 33 which are fed to the pixel format module 29 and the video storage 35.

The control of a rotatable transducer and the mapping of return echoes into a two dimensional picture from input data expressed in polar coordinates is well known to the art. Illustrative examples of this general technique are shown by Swain, "Polar to Cartesian Mapping Apparatus and Method", U.S. Pat. No. 4,241,412; Katagi, "Polar to Rectangular Coordinate Converter", U.S. Pat. No. 4,106,021; Nevin, et al, "Polar Coordinate Format to a Cartesian Coordinate Format Scan Converter", U.S. Pat. No. 4,002,827; Krohn, "Arrangement for Converting Polar Coordinate Servo Actuating Signals into Rectangular Coordinate Actuating Signals", U.S. Pat. No. 3,816,736; Brands et al, "Digital Scan Converter", U.S. Pat. No. 4,128,838; and Katogi, "Reduction of Target Shift in Coordinate Converter", U.S. Pat. No. 4,164,739. Further detail concerning spatial positioner 30, pixel format 29 and video storage 35 and their relationship will thus be omitted except to the extent to allow one with ordinary skill in the above art to apply known techniques to effect the present invention.

After a predetermined and controlled time delay, T/R module 15 disconnects excitation module 13 and receives echoes from medium 19. Transducer 17 produces an echo pulse 16 and 20 which comprises the echo data for a fixed period of time for a particular transducer direction. Echo pulse train 20 is passed into a conventional preamplifiermodule 21 and then into a conventional depth gain control module (DGC) 23. DGC module 23 is a conventional function generator which may be controlled externally, usually manually, by an operator to provide increased signal amplification for distant echoes relative to near echoes. Without this module and its amplification features, many of the echo signals would be excessively small and fall outside the dynamic range of the processing circuitry.

The resultant echo pulse train 24 is converted to a digital signal at a selected time by A/D converter 25 as controlled by the master clock 11. Output signal 26 from A/D converter 25 is fed into amplitude and polarity detector module 27 for processing which is described in greater detail below in connection with FIG. 5. Module 27 is a unique device which simultaneously determines both the amplitude and polarity of a particular echo. Output 28 from amplitude and polarity detector 27 is fed into pixel format module 29 which selectively determines the amplitude and polarity information to be stored for a particular pixel element in the image. Pixel format module 29 is controlled by master clock 11 and also by the spatial direction encoded in input 32, which input controls the number of echoes per pixel. Data output 34 from the pixel format module 29 is fed on a line-by-line basis to and stored in video storage module 35. The direction of the transducer determined by input 32 is also encoded along with the data output 34. The collection of data continues until video memory 35 is filled with digital information sufficient for a final image display.

Master clock 11, after firing transducer 17 and collecting data for a sufficient number of directions, initiates a new cycle in which no new acoustic pulses are generated. Instead, a display cycle is begun in which the stored digital information is read from video storage 35 and sent to video decoder 37 through data stream 36. Data stream 36 is decoded line-by-line and transformed into a luminance and chrominance signal which is used to drive either a covnentional color television display module or RGB monitor 41. The details of video decoding are described below in relation to FIG. 7. Permanent copies of each image using standard television modules may be obtained through data stream 39 by video tape recorder 40.

B. The Amplitude and Polarity Detector

The following section details the method and apparatus of detector 27 used in FIG. 1. Amplitude and polarity detector 27 is a unique device which determines the polarity of the returned echo at the peak amplitude of each individual echo return from an acoustical interface. A typical pulse waveform 42 is illustrated in FIG. 2. The echo generally comprises a multiplicity of this type of signals, each with different amplitudes and polarities and collectively forming a wave train. The wave train is designated as f(t) 42 as shown in FIG. 3. The aplitudes of each waveform vary in magnitude and hence contain different areas under each half-cycle. The third echo 44 in the echo train f(t) is shown in FIG. 3 with a reverse polarity as compared to preceding echoes 45 and 46. FIG. 3 demonstrates an echo wave train at a particular time, t, while transducer 17 is in the receive mode. The letters P, Q, R, S, T and U as shown in FIG. 2 represent the area under each half-cycle of the waveform. The total amplitude of a particular waveform is equal to the absolute sum of all of the areas. This sum represents the energy of the return echo from a single acoustical interface.

The waveform in FIG. 2 depicts a "bipolar" type which, for purposes of definition, means that area R and area S do not differ significantly in numerial value, and that area R or area S are significantly greater in magnitude than area Q or T, and certainly greater than areas P and U. This waveform is typically maintained throughout the depth of field except for variations in amplitude which are primarily related to focusing. It is also known that in the near field of a typical transducer, that the waveform changes in a predictable and uniform manner. In other words, the amplitude of R increases and of Q increases but in opposite directions and finally, the amplitude of S diminishes. The degeneration or change of the bipolar waveform thus produces a "triplet" 47 configuration as illustrated in FIG. 4.

The amplitude and polarity detecting circuit is designed to preserve the same polarity value for that signal type which is expected and experimentally observed over the major part of the acoustic field. We can arbitrarily choose the polarity of the signals as depicted in FIG. 2 as positive. However, signals which are 180 degrees the reverse of the signals depicted in FIG. 2, i.e., waveform 44 of FIG. 3 must, therefore, be considered negative. This definition and significance is critical to the performance of the amplitude and polarity detector.

Figure 5:
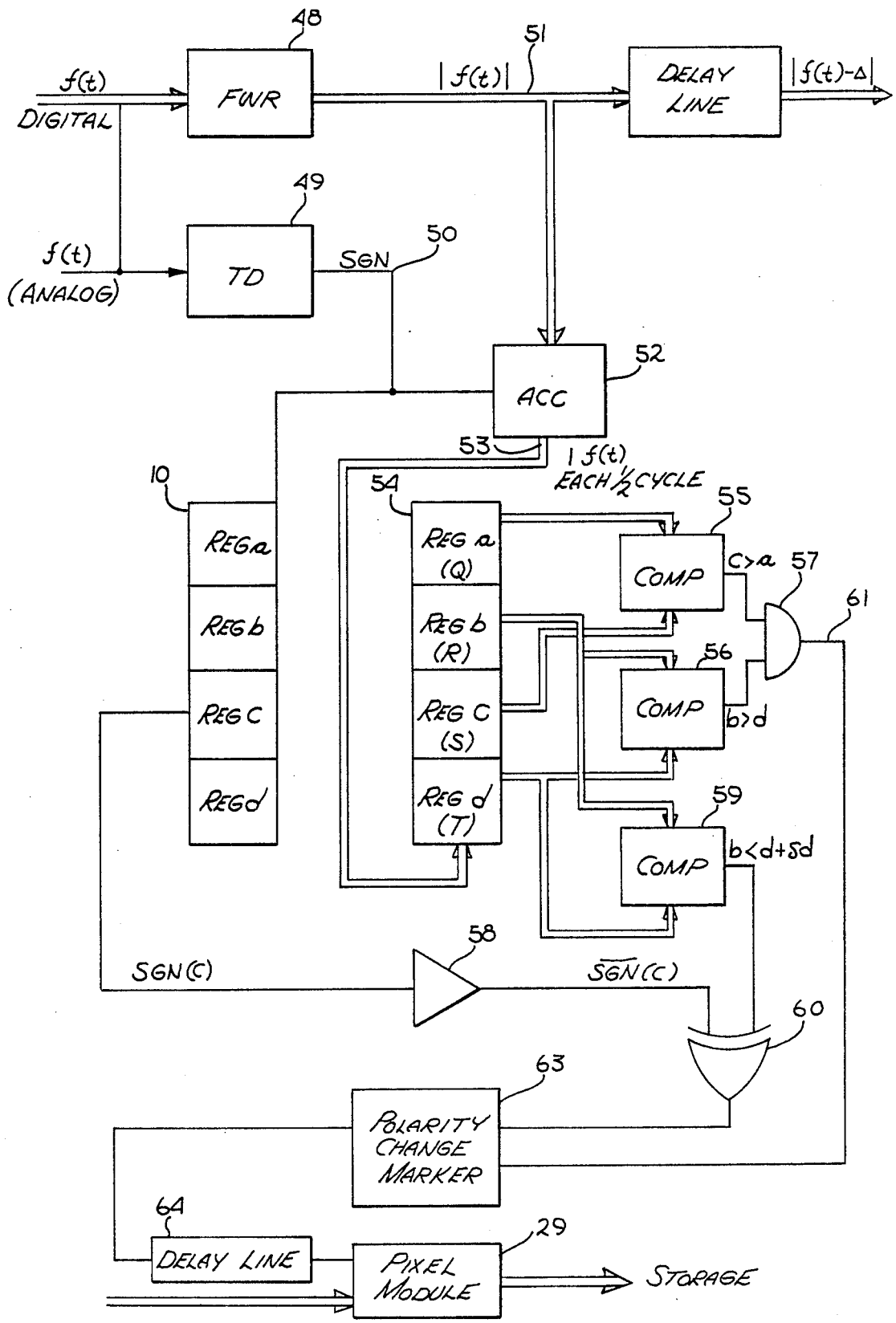
FIG. 5 is a more detailed block diagram of the amplitude and polarity detector shown in FIG. 1.

FIG. 5 is a block diagram illustrating the digital logic circuitry used to detect the polarity at the peak of an individual echo wave. The signal train f(t) is passed through a full wave rectifier, (FWR) 48, having been previously digitized by the A/D converter 25 in FIG. 1. The analog waveform of f(t) is passed through a threshold detector (TD) 49 producing an output waveform (SGN) 50 representing the polarity of each individual half-cycle of the analog wavetrain f(t). The digital absolute value, |f(t)| 51 is coupled to an accumulator 52 which is reset by the sign output, (SGN) 50 of the analog waveform f(t). Output 53, therefore, from the accumulator 52 consists of a series of values numerically equal to the area under each half-cycle of the waveform or half wave. Simultaneously, the polarity of each individual half-cycle is known from the threshold detector output (SGN) 50. The continuous stream of data 53 consisting of the areas P, Q, R, S . . . and data from successive echoes are fed into a four-position shift register 54 in the following manner: The shift register is compartmentalized into registers a, b, c and d. At a particular time, t, area P is loaded into register d. The next areas, Q, is computed and at the proper time determined by the transition of the clock (SGN) 50. Q is loaded into register d and P is shifted to register c. This process continues in this fashion during the total time of signal reception. The data contents in registers a, b, c & d are coupled to logic circuits consisting of comparators and other digital logic. The contents of register a and c are coupled to a comparator 55 whose output is true (1) whenever the value of register c is greater than or equal to the value stored in register a. In a similar manner the contents of register b and register d are coupled to a comparator 56 whose output is 1 only when the contents of register b is greater than register d. These two digital circuits are coupled to a digital AND gate 57 which produces an output 61 that is only 1 when register c is greater than or equal to register a, and register b is greater than register d. It is easy to demonstrate that the bipolar waveform depicted in FIG. 2 will produce a peak output from AND gate 57 only when amplitude Q is in register a, amplitude T is in register b, amplitude S is in register c and amplitude R is in register d. The sign of signal is determined from the circuit as the logical inverse of the sign of the signal corresponding in register c of sign shift register 10, i.e., SGN (c) 58. In the case of the signal in FIG. 2, the sign of the signal when the peak occurs is not the sign of register c, i.e., SGN (c), and therefore is positive for this particular waveform.

An additional comparator circuit 59 is also shown. Comparator circuit 59 compares the contents of register b to the contents of register d and some small selectable increment of register (s). The output of this comparator (b less than s+d) for cases of a bipolar waveform is generally not asserted, i.e., 0. This comparator output is coupled into an exclusive-OR gate 60. In the case of positive bipolar waveforms as depicted in FIG. 2 the output from the exclusive-OR gate 60 will be 1. In the reverse situation, i.e., when the bipolar signal is opposite in polarity, the output of the exclusive-OR gate 60 will be 0. Thus, in the case of bipolar signals, the time of peak and its polarity are detected appropriately. An alternative way of looking at the operation of exclusive-OR gate 60 is that the sign of the peak will be the value of SGN 58 unless the output from the comparator 59 is asserted.

Comparator circuit 59 is used for the situation in which the bipolar configuration begins to change to a triplet configuration as described and illustrated in FIG. 4. Analysis of the circuitry and logic of FIG. 5 will produce positive (1) peaks and corresponding positive (1) polarities for all situations in the waveform changes from a bipolar to a triplet configuration. Areas Q and S which are on either side of peak area R in the triplet configuration can cause the peak detector 57 to go to 1 when the polarity selected by register c as SGN (c) 58 is reversed. For the condition when area S is greater than or equal to area Q a positive peak will be detected when areas Q, R, S and P are in registers a, b, c, and d respectively. The output of the comparator 59 will be 1 and since the value SGN (c) 58 is still negative (0) in these two conditions, the output from the exclusive-OR gate 60 will remain positive (1). When the areas Q is somewhat greater than area S, a positive peak is produced when registers a, b, c and d contain P, Q, R, S, respectively. At the same time, the logical inverse of the SGN (c) 58, i.e., SGN (c), becomes positive (1). This is because the peak is detected when the areas P, Q, R and S are in registers a, b, c and d. Comparator 59 becomes negative (0). Without comparator 59, a polarity change would have occurred which would have produced an error. Furthermore, if S becomes much larger than Q, then comparator 59 will become positive (1) and the sign at the output of the exclusive-OR gate 60 will become negative. However, this condition occurs when the signal is no longer a positive "triplet" but rather a negative bipole. It should be realized that in this case of the negative bipole, the peak pulse will not be produced from the circuitry for peak detection since the comparator output would not yet have detected a peak.

FIG. 6 illustrates a composite timing diagram of the various signal pathways (described in FIG. 5) which provide the significant logic information generated in the amplitude and polarity detetion device as shown. For example, line 6a in FIG. 6, representing data line 51 |f(t)|, is depicted as a series of increasing and decreasing levels of digital data amplitudes. The abscissa of line 6a and each subsequent line represents time. Line 6a, therefore, is a digital representation of sample data representing the waveform depicted in FIG. 3. Line 6b is a representation of data in line delayed by a specified amount of time, Δ, which is adjustable. The need for Δ becomes low. Line 6c represents the output 61 from the AND gate 57 shown in FIG. 5. Line 6d represents the output 62 from the exclusive-OR gate 60 shown in FIG. 5. These two signals (i.e., 61 and 62 are coupled to polarity change marker 63 which compares the polarity just computed to the previous polarity. If no polarity changes have occurred, the polarity signal remains unchanged. In the case of a polarity change between the present signal and its preceding signal, a point in time, Tz, is computed according to the linear equation:

$$T_z = T_n + \frac{1}{1 + \frac{M_o}{M_n}} (T_o - T_n)$$

where
$T_o$ represents the time of the last polarity peak
$T_n$ represents the time of the present polarity peak
$M_n$ represents the magnitude of the peak amplitude value of the new polarity, and,
$M_o$ represents the magnitude of the peak of the preceding polarity.

The algorithm linearly computes a time, $T_z$, indicating the transition of the polarity pulse as shown in line 6e of FIG. 6. The value $T_z$ is needed to determine the time at which the polarity data is to be changed. Inspection of the equation shows that in the case of equal old and new magnitudes, $T_z$ occurs in time at a position equal to the mid-point in time between $T_n$ and $T_o$. As the magnitudes become unequal, different times are produced. In the case of the new magnitude being much greater than the old, the time marker shifts towards placing the time $T_z$ closer to the old time. In the reverse instance when the old magnitude is much larger than the new, the time marker $T_z$ shift towards the new time. This algorithm thus provides a linear shading dependent on amplitude between the two peaks. Line 6f in FIG. 6 represents the polarity output 64 from the polarity change marker 63. Line 6f shows that the polarity output remains positive until time $T_z$ when a reversal in polarity is produced. The data from line 6d, representing the absolute values of the digital data delayed in time by an amount Δ, and output 9 represented by line 6g in FIG. 6 are coupled to pixel format module 29 of FIG. 1.

Pixel format module 29 is controlled by a number of circuits already indicated which determine the number of individual digital data points to be stored in a particular address of the digital memory, i.e., the number of echoes for each pixel. The amplitude is computed as the sum of the absolute values divided by the number of absolute values chosen for the particular pixel. The corresponding polarity is computed in a similar manner utilizing the signed values of the corresponding amplitudes for the same number of data points. The computed paired data provides amplitude and polarity measures for a particular pixel and are stored in an addressable location in a digital memory device 35.

C. Video Decoder Module

Figure 7:
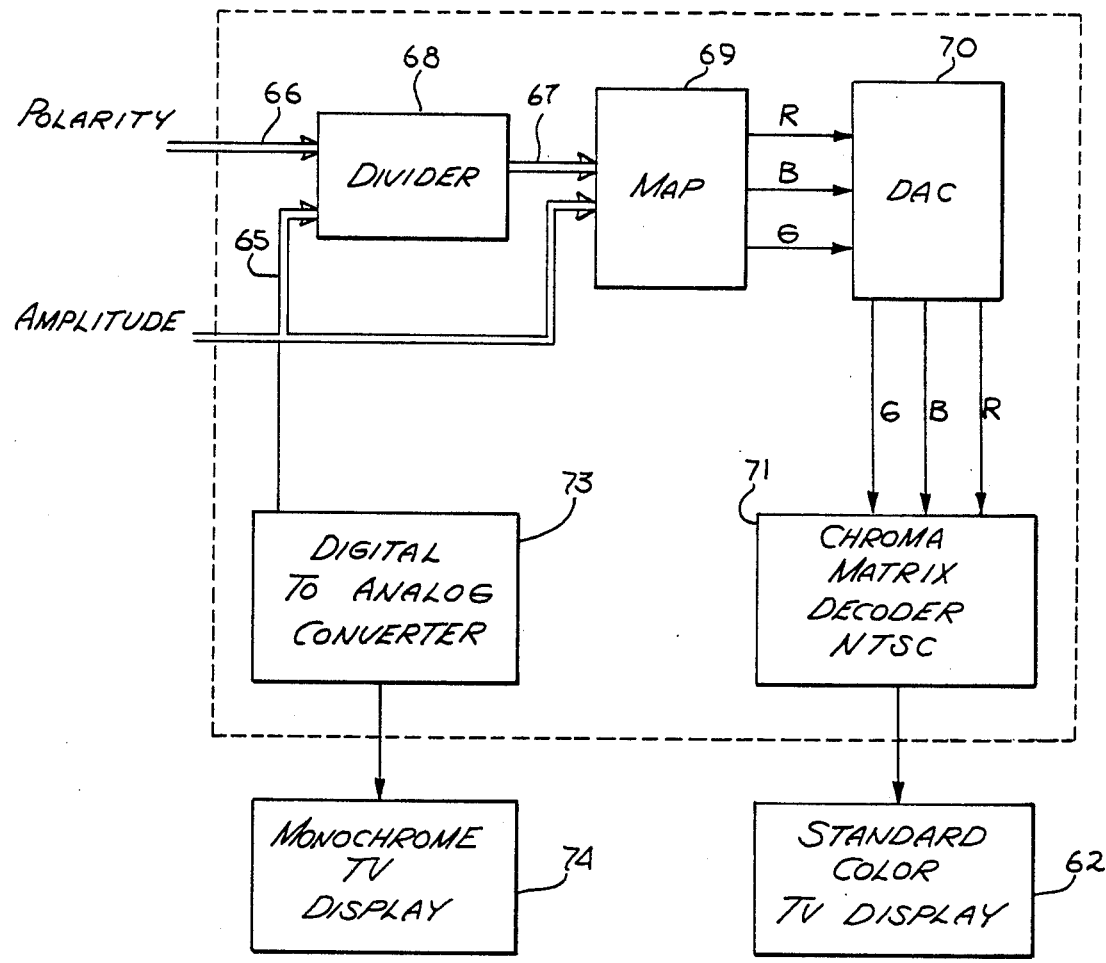
FIG. 7 is a more detailed block diagram of the video decoder of FIG. 1.

As previously indicated in FIG. 1, the stored digital data in video storage module 35 is used to produce the video image during the image display cycle. Data stream 36 depicted in FIG. 1 provides the amplitude and polarity data just previously described which have been stored in digital memory 35. For each pixel location, the amplitude and polarity data are coupled to decoder 37 in FIG. 1, for video decoding. FIG. 7 shows the two data streams which are coupled to video decoder 37. These two data streams were previously represented as data stream 36 in FIG. 1. Data stream 65 represents the amplitude data for each pixel, and data stream 66 represents the polarity data for each pixel. Data streams 65 and 66 are coupled to a divider 68 in which data stream 66 is divided by data stream 65 resulting in data stream 67. Data stream 67 represents a signal which will vary between the limits +1 to −1, since it represents a ratio between the signed amplitude data per pixel and the absolute value per pixel.

The +1 condition occurs when all of polarity stream data 66 is equal to the amplitude data 65 and is of like sign. The reverse situation occurs when polarity stream 66 is equal in numerical value to amplitude data 65 but is opposite in sign. All combinations between the two limits can occur. For example, polarity data 66 may be precisely zero. This can occur if a pixel contains the digital data representing two echoes equal in magnitude but opposite in sign. Intermediate values by similar considerations can also occur.

Data stream 67 representing the ratio information just described and amplitude data 65 are fed to a hue generator or hue map 69. The hue map module 69 utilizes a multi color system. For purposes of description the operation of this system is described as using a green-/yellow/red formation. Any number of hues could have been equally chosen. We will arbitrarily choose the +1 extreme as the color green and the −1 extreme as the color red. This means that an amplitude whose ratio value in data stream 67 is +1 will appear in final output as green and at an intensity proportional to its amplitude as indicated by data stream 65. Similarly, a signal whose ratio is −1 will appear as a red signal of an intensity proportional to the amplitude of data stream 65. Equal intensities of data producing a ratio signal near zero will be encoded as yellow and a magnitude proportional to the amplitude of data stream 65. Other hues are also selectable between the ranges +1 and −1 solely dependent upon the value of the ratio computed. The output from the map module 69 produces three digital voltage levels which are in the proper ratio to produce the selected hue and intensity by a red, blue, green color monitor. These three signals, now in digital format are converted to analog voltages by the digital-to-analog converter (DAC) 70. The analog signals representing the red/blue/green color monitor voltages are coupled into a matrix encoder 71 in which the red/blue/green voltage signals are transformed into a conventional chroma and luminance signal found in conventional color television monitors. The output signal is now in standard NTSC TV format and is coupled to a color TV 72. Additionally, the amplitude data alone can be separately converted to an analog signal 73 and then coupled to a standard monochrome television display 74. These two images provide comparative images useful in clinical diagnosis.

Although the illustrative example is disclosed as being applied to imaging in medical diagnostic devices, it is believed that the methodology and apparatus of the present invention would be equally applicable in a wide variety of other applications commonly employed today such as nondestructive testing of alloys, machine components, welds, and other areas, collectively called nondestructive testing.

While we have described the preferred embodiment of our invention, the invention may be embodied otherwise than as specifically illustrated herein, and that certain changes in the form and arrangement of parts may be made without departing from the underlying idea or principles of this invention within the scope of the following claims.

We claim:

1. An improvement in an apparatus for processing multiple cycle, ultrasonic pulse echo signals having amplitude and polarity in combination with a transceiver to send and receive ultrasound echoes comprising:
   integrator means for accumulating said ultrasound echo signals for each half wave of said multicycle ultrasound pulse echo signals and for generating an integrated, absolute value, half-wave signal from said half-wave of said multicycle pulse echo signal; and
   means for examining a plurality of said absolute value, half-wave signals and analyzing said plurality of half-wave signals to determine if a predetermined pattern indicative of a pulse echo among said plurality of half-wave signals is present, said means coupled to said integrator means,
   whereby individual echoes reflected from complex body media are detected without deconvolutional computation and without the use of specialized ultrasound transducers.

2. The improvement of claim 1 wherein said means for examining and analyzing includes a shift register coupled to said integrator means, each output of said shift register coupled to one of a plurality of comparators, said comparators having their inputs coupled to at least two outputs of said shift register in order to compare said outputs, and logic means coupled to the outputs of said comparators to detect said predetermined pattern.

3. The improvement of claim 1 or 2 wherein said integrator means includes a full wave rectifier to generate the absolute value of said ultrasound echo signals and an accumulator for integrating each half-wave signal.

4. The improvement of claim 1 or 2 wherein said means for examining and analyzing detects a pattern indicative of a bipolar pulse echo.

5. The improvement of claim 4 wherein said means for examining and analyzing includes a sign shift register for storing the polarity of said half-wave of said multicycle, ultrasound, pulse echoes, and wherein said means for examining and analyzing includes triplet means for detecting a triplet pulse echo and for generating a corrected polarity signal when said triplet pulse echo is detected.

6. An improvement in an apparatus for the detection of amplitude and polarity of individual ultrasound pulse echo signals reflected from complex body media comprising:
- a full-wave rectifier to generate an absolute value signal of said amplitude of each half-wave of each said ultrasound echo;
- a threshold detector to generate a polarity signal corresponding to each said absolute value signal to indicate whether said corresponding half-wave is positive or negative;
- an accumulator coupled to said full-wave rectifier and threshold detector to integrate said absolute value signal for each half-wave;
- amplitude shift register coupled to said accumulator for storing a plurality of said integrated absolute value signals of said half-waves;
- a plurality of comparators coupled to said amplitude shift registers for comparing said stored integrated absolute value signals among each other; and
- logic means coupled to said plurality of comparators for detecting a predetermined pattern among said stored integrated absolute value signals indicative of a bipolar ultrasound echo,
- whereby individual ultrasound echoes reflected from complex body media are detected without deconvolutional computation and without the use of specialized ultrasound transducers.

7. The improvement of claim 6 further comprising:
- a polarity shift register coupled to said threshold detector to store a corresponding plurality of sign signals;
- a triplet comparator coupled to said amplitude shift register to detect a triplet pulse echo; and
- triplet logic means coupled to said polarity shift register and said triplet comparator to correct said polarity signal of said threshold detector stored in said polarity shift register when a triplet pulse echo is detected.

8. The improvement of claims 1, 5 or 6 further comprising a polarity change marker means for detecting a change of sign in said polarity signal and for generating said change at a time computed by said marker means to be at a point averaged between sign reversal maxima of said pulse echo signals as weighted by the amplitude of said maxima.

9. An improvement in an apparatus for displaying a plurality of detected signals per pixel characterized by amplitude and polarity comprising:
- a divider having polarity data input characteristic of the signed sum of said plurality of detected signals and having an amplitude input characteristic of the sum of the absolute values of said plurality of detected signals, said divider generating an output ratio signal equal to the ratio of said polarity input to said amplitude input; and,
- a hue generator means coupled to said divider for mapping said output ratio signal into a linear combination of hue signals,
- whereby said polarity generates a color display per pixel of intensity per pixel.

10. The improvement of claim 9 wherein said hue generator means has said amplitude input and generates an intensity signal per pixel from said amplitude input.

11. The improvement of claim 10 further comprising:
- a digital-to-analog converter coupled to said hue generator;
- a chroma matrix decoder coupled to said digital-to-analog converter, said decoder to translate said primary hue signals into a television compatible format; and,
- a color television display unit coupled to said decoder.

12. The improvement of claim 9 further comprising a digital-to-analog converter coupled to said amplitude input, and a monochrome television display unit coupled to said digital-to-analog converter.

13. An improvement in an apparatus for displaying a weighted transition between ultrasound pulse echoes comprising:
- means for generating a peak amplitude signal characteristic of the magnitude of the peak of each said echo;
- means for generating a polarity signal characteristic of the sign of said peak of each said echo; and
- polarity change marker means coupled to said means for generating said polarity and peak amplitude signals, said marker means for computing a time of polarity reversal in response to a reversal of said polarity signal as weighted by said peak amplitude signal for two successive pulse echoes respectively prior to and subsequent to said reversal of said polarity signal,
- whereby amplitude and polarity characteristics of said pulse echoes is used to shade the displayed between pulse echoes representing an acoustic interface.

14. The improvement of claim 13 wherein said time of polarity reversal, $T_z$, computed by said marker means is computed by said marker means according to the algorithm $$T_z = T_n + \frac{1}{1 + \frac{M_o}{M_n}} (T_o - T_n)$$

where
- $T_o$ represents the time of the peak just prior to polarity reversal
- $T_n$ represents the time of the peak just subsequent to polarity reversal
- $M_o$ represents the absolute magnitude of the peak just prior to polarity reversal
- $M_n$ represents the absolute magnitude of the peak just subsequent to polarity reversal.

15. An improvement in a method for the detection of the amplitude and polarity of each multicycle, pulse echo reflected from complex media comprising the steps of:
- integrating each half-wave signal of said multicycle pulse echo to generate an absolute integral value signal corresponding thereto;

comparing a series of successive integral value signals to determine if a predetermined pattern among said integral value signals is present; and generating a peak identification signal when said predetermined pattern is detected, whereby ultrasound echoes are detected without deconvolutional signal processing and computation and without the use of specialized acoustic pulse generators or transducers.

16. The improvement of claim 15 wherein the step of integrating each half-wave comprises the steps of:

generating the absolute value of said half-wave signal;

detecting the zero-crossing times of said half-wave signal; and accumulating the absolute value of said half-wave signal between said zero-crossing times to generate said integral value signal.

17. The improvement of claim 15 or 16 wherein the step of comparing comprises the steps of:

sequentially storing said integral value signals for successive half-wave signals in a shift register;

comparing said integral value signals in said shift register to generate an intermediate output indicative of the comparative relationship among said integral value signals; and testing said intermediate output to determine if a preselected relationship exists between said integral value signals.

18. The improvement of claim 15 further comprising the steps of:

sequentially storing a sign bit indicative of the polarity of each said half-wave signal;

comparing said integral value signals to detect a triplet waveform;

correcting said sign bit when said triplet waveform is detected.

19. An improvement in a method for displaying a plurality of detected signals per pixel characterized by amplitude and polarity comprising the steps of:

generating a ratio of the signed sum of said plurality of detected signals to the sum of the absolute values of said plurality of detected signals; and generating a linear combination of hue signals in response to said ratio, a $+1$ value of said ratio being mapped into a first hue, 0 being mapped into a second hue, $-1$ being mapped into a third hue and values between $+1$, 0, $-1$ being mapped into linear combinations of said hues.

20. The improvement of claim 19 further comprises the steps of converting said hue signals into analog hue signals, and decoding said analog hue signals into a color television compatible format.

21. The improvement of claims 19 or 20 further comprising the steps of generating an intensity signal from said sum of the absolute values of said plurality of detected signals.

22. An improvement in a method for displaying a weighted transition between ultrasound pulse echoes comprising the steps of:

generating a peak amplitude signal characteristic of the magnitude of the peaks of each said echo;

generating a polarity signal characteristic of the sign of said peak of each said echo;

generating a time of polarity reversal in response to a reversal of said polarity signal, said time of polarity reversal being selected between the time of two successive peak amplitude signals having a corresponding oppositely signed polarity signal and being selected proportionately nearer the time of the larger of said successive peak amplitude signals, whereby peak amplitude and polarity of said pulse echoes is used to shade the displayed transition across an acoustical interface.

23. The improvement of claim 22 the time of polarity reversal $T_z$, is generated by execution of the algorithm $$T_z = T_n + \frac{1}{1 + \frac{M_o}{M_n}} (T_o - T_n)$$

where $T_o$ represents the time of said peak amplitude just prior to polarity reversal $T_n$ represents the time of said peak amplitude just after polarity reversal $M_o$ represents the absolute peak amplitude of the peak just prior to polarity reversal $M_n$ represents the absolute peak amplitude of the peak just after polarity reversal.

* * * * *